(12) United States Patent
Funken et al.

(10) Patent No.: US 8,210,048 B2
(45) Date of Patent: Jul. 3, 2012

(54) PRESSURE TRANSFER DEVICE AND PRESSURE MEASURING DEVICE WITH SUCH PRESSURE TRANSFER MEANS

(75) Inventors: Dieter Funken, Lorrach (DE); Igor Getman, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 13/003,630

(22) PCT Filed: Jun. 23, 2009

(86) PCT No.: PCT/EP2009/057824
§ 371 (c)(1),
(2), (4) Date: Jan. 11, 2011

(87) PCT Pub. No.: WO2010/006898
PCT Pub. Date: Jan. 21, 2010

(65) Prior Publication Data
US 2011/0113889 A1    May 19, 2011

(30) Foreign Application Priority Data
Jul. 16, 2008    (DE) .......................... 10 2008 033 337

(51) Int. Cl.
     *G01L 7/08*      (2006.01)
(52) U.S. Cl. ....................................................... 73/706
(58) Field of Classification Search ............. 73/700–756
See application file for complete search history.

(56) References Cited

U.S. PATENT DOCUMENTS

| 2,369,707 | A | * | 2/1945 | Baak ............................... 73/706 |
| 3,187,641 | A | | 6/1965 | Bowditch |
| 2002/0178824 | A1 | * | 12/2002 | Becker et al. .................. 73/715 |
| 2010/0162820 | A1 | * | 7/2010 | Dannhauer et al. ............. 73/706 |

FOREIGN PATENT DOCUMENTS

| DE | 100 31 120 A1 | 1/2002 |
| EP | 1 114 987 A2 | 7/2001 |
| JP | 06137982 A | * 5/1994 |

OTHER PUBLICATIONS

Christian Wohlgemuth: Entwurf and galvanotechnische Fertigung metallischer Trennmembranen fur mediengetrennte piezoresistive Drucksensoren, 2008.

\* cited by examiner

*Primary Examiner* — Andre Allen
(74) *Attorney, Agent, or Firm* — Bacon & Thomas, PLLC

(57) ABSTRACT

A pressure transfer device comprises a pressure transfer device body and an isolating diaphragm, wherein, between the surface of the body of the pressure transmitting device and the isolating diaphragm, a pressure chamber is formed, whose volume is dependent on the position of the isolating diaphragm. The isolating diaphragm has a material thickness and a deflectable working region with an area A, wherein the isolating diaphragm has a reference position, in which the pressure chamber contains a reference volume $V_{ref}$, and the isolating diaphragm is deflectable from the reference position at least so far in two directions, that the volume of the pressure chamber varies between values of up to $V_{ref}+/-\Delta V_{desired}$, wherein associated with a volume change $\Delta V$ is a dimensionless deflection measure w, with $w(\Delta V):=(3\cdot \Delta V)/(A\cdot h)$, wherein $\Delta V_{desired}$ is dimensioned in such a way, that $|w(\Delta V_{desired})|\geq 2.5$; wherein, in the case of all $w(\Delta V)$, for which $|w(\Delta V)|\leq |w'(\Delta V)|$, wherein $|w'(\Delta V)|\geq 0.5\cdot |w(\Delta V_{desired})|$, the isolating diaphragm has a non-axisymmetric deflection mode, which is superimposed on the axisymmetric deflection of $w(\Delta V)$, and wherein the deflection of the non-axisymmetric deflection mode, in the case of $|w(\Delta V)|=0.4\cdot |w(\Delta V_{desired})|$, amounts to at least 0.3 times the maximal deflection of the non-axisymmetric deflection mode.

14 Claims, 4 Drawing Sheets

PRESSURE TRANSFER DEVICE AND PRESSURE MEASURING DEVICE WITH SUCH PRESSURE TRANSFER MEANS

TECHNICAL FIELD

The present invention relates to an isolating diaphragm for a pressure transfer device as well as to a pressure transfer device with such a diaphragm, and to a pressure measuring device that has such a pressure transfer device.

BACKGROUND DISCUSSION

Pressure transfer device serve to transfer the pressure of a measured medium via a hydraulic path to a pressure sensor. For this, a pressure transfer device or means usually includes a body of the pressure transfer means, on which, by means of an circumferential joint, is pressure-tightly secured an isolating diaphragm, forming a chamber of the pressure transfer means between the isolating diaphragm and the body of the pressure transfer means. From the chamber of the pressure transfer means, a hydraulic path extends through the body of the pressure transfer means to the pressure sensor, in order to supply this with a media pressure, which the isolating diaphragm is exposed to on its outer side facing away from the pressure transfer means.

The transfer liquid, most often an oil, enclosed in the hydraulic path and in the chamber of the pressure transfer means causes, due to its temperature-dependent volume expansion, a variable position of the isolating diaphragm. In such case, it is to be noted that established pressure sensors—for example, semiconductor sensors or capacitive sensors—have an extremely small pressure-dependent deflection of their measuring elements, so that, in the measuring range of the pressure measuring devices, at most negligible pressure-dependent volume displacements of the transfer liquid occur, and the position of the isolating diaphragm determined by the temperature describes well in first approximation its actual position for measurement operation.

Insofar as an isolating diaphragm is an elastic component, the deflection of the isolating diaphragm when shifting its position effects an additional pressure dp between the measured pressure px presiding on the outside of the isolating diaphragm and the chamber pressure pk in the chamber of the pressure transfer means. This pressure dp=px−pk can, especially in the case of small measuring ranges, far exceed the measurement error of the actual pressure sensor.

The absolute value of dp=px−pk is not actually of importance. For, if this value were constant, then it could easily be compensated for during a measuring. The problem lies in the fact that dp changes with the deflection of the isolating diaphragm, and that the size of the changes increases with the size of the absolute value of dp.

There are therefore numerous approaches to minimize the pressure dp.

In industrial process measurements technology, isolating diaphragms with an impressed wave pattern especially have become common. These diaphragms are, in the case of small deflections, stiffer than planar diaphragms; however, they enable, as a whole, larger deflections.

German Patent DE19946234C1 describes a diaphragm for a pressure transfer means, which has a circular central area and, on the edge, an edge surface for clamping, both of which are connected with one another via annular surfaces arranged concentrically to one another and offset from one another in axial direction in the form of steps, wherein the individual annular surfaces are alternately inclined radially outward and radially inward with respect to a plane parallel to the diaphragm plane, wherein each of the annular surfaces, rounded off with a radius, transitions via a step to the next annular area. This shaping of the isolating diaphragm is supposed to have the effect, that the movements of the isolating diaphragm caused by thermal expansions, thus the change of its equilibrium position, corresponds to the shifting of the working point of the isolating diaphragm caused by the volume expansion of the transfer liquid.

A similar approach is described in the Offenlegungsschrift DE10031120A1, according to which the coefficients of thermal expansion of an isolating diaphragm and the body of the pressure transfer means on which the isolating diaphragm is secured, as well as the coefficient of thermal expansion of the pressure transfer medium are matched to one another in such a manner, that a thermally caused volume change of the transfer liquid can be absorbed by a shifting of the resting position of the isolating diaphragm in the chamber of the pressure transfer means between the isolating diaphragm and the body of the pressure transfer means.

The two described approaches are theoretically very interesting; however, in practice, they are only feasible in a very limited manner, for they presuppose temperature equilibrium between the transfer liquid, the isolating diaphragm and the body of the pressure transfer means. This presupposition is, for most applications in process measurements technology, not fulfilled, so that, in the case of temperature jumps, the described arrangements can cause even larger measurement errors than pressure measuring arrangements with conventional isolating diaphragms without a temperature-dependent control function.

Another point of view concerning the pressure due to the isolating diaphragm deflection is considered in European patent EP1114987B1. In this document, the concern is not to cause the contribution of the isolating diaphragm to the pressure to disappear, but rather instead to linearize it. For this, a diaphragm is provided which has annular, trapezoidal surfaces, which, in each case, are connected with one another via inclines of 45°.

The linearizing of the pressure p(T) is based on the idea that, with knowledge of the temperature, a simple compensation for the pressure p(T) should be possible. The determining of the effective temperature, which defines the actual volume of the transfer liquid, is, however, in most cases, in which no temperature equilibrium is given, extremely complicated.

A completely different approach is described in Offenlegungsschrift DE102005023021A1, according to which a pressure transfer means has an isolating diaphragm having at least two equilibrium positions, and wherein the working point of the pressure transfer means for the temperature range in question should always lie between these two equilibrium positions. This means, however, that the isolating diaphragm is bistable, and can display an oil canning behavior, as discussed, for example, in DE 10152681A1

In DE 102005023021A1, it is described that the diaphragm is first embossed with a wave pattern, wherein the annular waves alternately have heights H1 and H2, and the diaphragm is then axially compressed with a plunger, wherein, through the compression, material is shifted radially from the waves with the greater height H1 to the waves with the smaller height H2. This should effect that the inner region of the isolating diaphragm can assume at least two different rest positions. Then, in the ideal case, there should be used with the liquid exactly that amount of pressure, with which essentially no return force acts in the direction of one of the two rest positions, since the diaphragm behaves at this working point as a restoring-forceless diaphragm.

This idea is interesting at a first glance; it overlooks, however, that this condition of restoring-forcelessness is only fulfilled exactly in the equilibrium positions, and that between the equilibrium positions, the diaphragm always seeks the most energetically favorable, nearest equilibrium position, which can have for the pressure p the effect of a hysteresis or oil canning behavior.

In the case of the prevalent variety of diameters and material thicknesses of isolating diaphragms having the most varied of dimensions and embossed patters, for comparison of performance, it is usual to use a dimensionless pressure p defined as follows:

$$p := \frac{q \cdot a^4}{E \cdot h^4}, \quad (1)$$

In such case, q is the pressure earlier referred to with dp due to a deflection of the isolating diaphragm, h the diaphragm's material thickness, a its radius and E the modulus of elasticity of the material of the isolating diaphragm.

The dimensionless pressure p can especially be presented as a function of a dimensionless deflection w, wherein w is defined as
w:=y/h, wherein y is a length which is dependent on the volume change V of the transfer liquid, which has caused the deflection of the isolating diaphragm.

Helpful here is an estimation of y as the height of a cone, whose base equals the movable area of the isolating diaphragm and whose volume is equal to the volume change of V, thus:

$$w := \frac{1}{h} \cdot \frac{3 \cdot V}{\pi \cdot a^2}, \quad (2)$$

It should again expressly be emphasized that with the deflection y and the variable w derived therefrom need not be associated a directly measurable length on the isolating diaphragm. It is only a simple volume-proportional length measurement to provide a basis for the comparison of isolating diaphragms.

A comprehensive overview for the design of isolating diaphragms is given by the formalism for description of isolating diaphragms with an impressed sinusoidal wave pattern in "Flat and corrugated diaphragm design handbook" by Mario Di Giovanni, which builds upon the work of the Russians Feodos'ev and Andreeva. According to this, the following relationship holds:

$$p := A(q) \cdot w + B(q) \cdot w^3 \quad (3),$$

wherein stiffness coefficients A and B are functions of a variable q, which, in turn, is a function of the height of the impressed wave pattern, thus: $q^2 := 1.5*(H/h)^2 + 1$, wherein is the height of the embossed pattern. For other details of the functions A(q) and B(q), reference should be made to the work of Di Giovanni. With the increasing height of the embossed pattern, in any event, A becomes larger and B smaller. In a diaphragm design, it is thus to be established which maximum deflection $w_{max}$ is provided, in order to keep the value $p(w_{max})$ as small as possible.

When, for example, an isolating diaphragm having a wave pattern for a deflection of up to a value of $w_{max}=5$ should be designed, this means a value for p of, for instance, 140. For a diaphragm with a radius a=29 mm, a material thickness of h=100 µm, and a modulus of elasticity of 200 GPa, this means a diaphragm error of, for instance, 40 mbar, wherein w, under the assumption of the above described approximation with a conical volume, corresponds, say, to a volume deflection of, for instance, 430 µl. Such volume deflections can, in the case of capillary pressure transmitting means, certainly occur, and a measurement error of 40 mbar is—especially in the case of small measuring ranges of, for example, 100 mbar—not acceptable. The fundamental limits of wave diaphragms are thereby clearly evident.

Diaphragms with a trapezoidal or step-shaped contour enable diaphragm designs, in the case of which the value for p(w) is, for instance, halved in comparison with comparable wave diaphragms. Even this is still not sufficient for many applications.

SUMMARY OF THE INVENTION

It is, therefore, an object of the present invention to provide a pressure transfer means, and a pressure measuring transducer with such a pressure transfer means, which overcome the described disadvantages of the state of the art.

The object is achieved according to the invention by the pressure transfer means according to the independent patent claim 1 and the pressure sensor according to the independent claim 14.

The pressure transfer means of the invention comprises a pressure transfer means body having a surface, and an isolating diaphragm pressure-tightly connected with the body of the pressure transfer means along a circumferential sealing surface, wherein, between the surface of the body of the pressure transmitting means and the isolating diaphragm, a pressure chamber is formed, whose volume V is dependent on the position of the isolating diaphragm, wherein the isolating diaphragm has a material thickness h, wherein the isolating diaphragm has a deflectable working region of area A bordered by the sealing surface, wherein the isolating diaphragm has an embossed contour, wherein the isolating diaphragm has a reference position, in which the pressure chamber contains a reference volume $V_{ref}$, wherein the isolating diaphragm is essentially axisymmetrically deflectable from the reference position at least so far in two directions, that the volume of the pressure chamber can be varied between values of up to $V_{ref}+/-\Delta V_{desired}$, wherein associated with a volume change $\Delta V$ is a dimensionless deflection measure w, which is defined as $w(\Delta V):=(3*\Delta V)/(A*h)$, wherein $\Delta V_{desired}$ is dimensioned in such a way, that $|w(\Delta V_{desired})| \geq 2.5$; characterized in that, in the case of all $w(\Delta V)$ for which $|w(\Delta V)| \leq |w'(\Delta V)|$, wherein $|w'(\Delta V)| \geq 0.5*|w(\Delta V_{desired})|$, the isolating diaphragm has an additional, in first approximation non-axisymmetric deflection mode, which is superimposed on the axisymmetric deflection of $w(\Delta V)$.

In a further development of the invention, the deflection of the antisymmetric deflection mode in the case of $|w(\Delta V)|=0.4*|w(\Delta V_{desired})|$ amounts to at least 0.3 times, preferably at least 0.4 times and more preferably at least 0.5 times the maximum deflection of the non-axisymmetric deflection mode.

An axisymmetric deflection zs(r, φ, ΔV) is a volume-dependent deflection of the z-coordinate of the individual points (z, r, φ) of an isolating diaphragm zs(r, φ, ΔV):=z(r, φ, ΔV)−z(r, φ, 0), wherein: zs(r, φ, ΔV)≧z(r, φ+180°, ΔV).

Preferably: z(r, φ, 0)≧z(r, φ+180°, 0)

The non-axisymmetric deflection mode can be, for example, an antisymmetric deflection mode which, for example, is defined by a function zas(r, φ, ΔV) for which:

zas(r,φ,ΔV)≧−zas(r,φ+180°,ΔV)

wherein the value for zas(r, ϕ, ΔV) is given as the difference between the actual z-coordinate of a point of the surface of the isolating diaphragm and the z-coordinate of the point in the case of a symmetric deflection of the isolating diaphragm:

$$zas(r,\phi,\Delta V):=z(r,\phi,\Delta V)-zs(r,\phi,\Delta V),$$

wherein the function zs(r, ϕ, ΔV) is to be selected in such a manner, that the integral of the square of zas(r, ϕ, ΔV) over the area of the working region has a minimum and especially assumes the value zero.

According to a further development of the invention, the criterion, that the deflection of the non-axisymmetric deflection mode $|w(\Delta V)|=0.4*|w(\Delta V_{desired})|$ amounts to at least 0.3 times, preferably at least 0.4 times and more preferably at least 0.5 times the maximal deflection of the non-axisymmetric deflection mode, means, for the case that the non-axisymmetric deflection mode is the antisymmetric deflection mode, that the integrals of $|zas(r, \phi, 0.4*\Delta V)|$ and $|zas(r, \phi, -0.4*\Delta V)|$ amount, in each case, to at least 0.3 times, preferably at least 0.4 times and more preferably at least 0.5 times the maximal deflection of the antisymmetric deflection mode, especially the deflection of the antisymmetric deflection mode in the reference position $|zas(r, \phi, 0)|$.

According to a further development of the invention, the function zas(r, ϕ, ΔV) can be separable:

$$zas(r,\phi,\Delta V):=zasr(r,\Delta V)*zasphi(\phi),$$

wherein zasphi(ϕ) can, for example, be cos(phi).

According to a further development of the invention, a deflection mode is still considered to be antisymmetrical in the sense of the invention, when, in the case of a given ΔV for the maximum value of |zas(r, ϕ, ΔV)|, the following criterion for the deviation from a strict antisymmetry is obeyed:

$$[|zas(r,\phi,\Delta V)+zas(r,\phi+180°,\Delta V)|]/[|zas(r,\phi,\Delta V)-zas(r,\phi+180°,\Delta V)|] \leq 0.2,$$

especially ≦0.1, preferably ≦0.05 and especially preferably ≦0.025.

The antisymmetric deflection mode has, according to a further development of the invention, a dimensionless maximum deflection k, which is defined as:

$$k:=\text{maximum}(|zas(r,\phi,\Delta V)-zas(r,\phi+180°,\Delta V)|/h),$$

and for which: $|k|\geq 2$, preferably $|k|\geq 3$, wherein the maximum deflection in a currently preferred embodiment of the invention occurs near the reference position of the isolating diaphragm, i.e. when the deflection of the isolating diaphragm w amounts to less than $+/-0.2\,w_{desired}$, especially less than $0.1\,w_{desired}$, and preferably less than $0.05\,w_{desired}$, wherein $w_{desired}=w(\Delta V_{desired})$.

In a further development of the invention, it is furthermore true that $|k|\geq 6$, preferably that $|k|\geq 5$, more preferably that $|k|\geq 4$.

In a further development of the invention, the deflection k of the antisymmetric deflection mode amounts in the case of $|w\Delta V|=0.5*|w(V_{desired})|$ to at least 0.4 times, preferably at least 0.5 times the maximal deflection of the antisymmetric deflection mode.

The deflection w(r,ϕ) of the antisymmetric deflection mode is defined as the deviation from a rotationally symmetric deflection y(r), which is referenced to the reference position of the isolating diaphragm.

In a further development of the invention, the isolating diaphragm is deflectable from the reference position up to a deflection of $|w(V_{desired})|\geq 3$, preferably ≧4, more preferably ≧5 and especially preferably ≧6.

In a further development of the invention, there holds for the dimensionless pressure, for example, that: $|p(w(V_{desired}))-p(w(-\Delta V_{desired}))|/|w(V_{desired})-w(-\Delta V_{desired})|\leq (|w(\Delta V_{desired})|+2)*2$, preferably $\leq (|w(\Delta V_{desired})|+2)$, especially preferably $\leq (|w(\Delta V_{desired})|+2)/2$.

In a further development of the invention, there holds for the dimensionless pressure, for example, in the case of all w with $(|w|\leq(|w(\Delta V_{desired})-0.2|)$, that:

$$|p(w+0.2)-p(w-0.2)|/0.4\leq (|w|+2)*2,\text{ preferably}$$
$$\leq (|w|+2),\text{ especially preferably }\leq (|w|+2)/2.$$

In a further development of the invention, there holds for the dimensionless pressure of the isolating diaphragm for a deflection range that is defined by $|w|\geq 4$ that: $|p(w+0.2)-p(w-0.2)|/0.4\leq 4$, preferably ≦3.

The contour of the isolating diaphragm has, according to a further development of the invention, a central, planar region, which is surrounded by a waved region with preferably concentric waves.

In a further development of the invention, the central region preferably has a diameter of no more than $2*a/3$, especially preferably no more than a/2, wherein a is the radius of the working region of the isolating diaphragm.

The amplitude of the waves of the waved region must not be constant. In a currently preferred embodiment, the amplitude of the waves initially decreases from the inside moving outward, wherein an outermost wave then adjoins, which can again have a larger amplitude.

The amplitude of the wave adjoining the outermost wave can, for example, have ⅓ to ⅔ the amplitude of the wave adjoining the central region.

According to a further development of the invention, the waves, apart from the outermost wave, have, for example, a maximum amplitude of no more than 4 h, preferably no more than 3 h, and more preferably no more than 2 h.

According to a further development of the invention, the waves, apart from the outermost wave, have wavelengths, which vary from one wave to the next wave by no more than 20%, preferably no more than 10%.

The antisymmetric deflection mode can, according to an embodiment of the invention, according to the embossing of the contour, be enabled by an extensive, in given cases two-sided, symmetric deflection of the isolating diaphragm, for example, with values of $|w|>5$. Subsequently, the isolating diaphragm, in the case of a suitably predetermined contour, can have in the reference position, in given cases, the antisymmetric deflection mode to the desired degree.

Furthermore, according to another embodiment of the invention, the antisymmetric deflection mode can be excited by embossing of the diaphragm on a diaphragm bed, whose axis is slightly inclined compared to the axis of the sealing surface, for example, by not less than, for instance, 1°, more preferably not less than 2°. An angle of inclination of more as 4° is not required according to current thinking.

According to an additional embodiment of the invention, the antisymmetric deflection mode can be excited by a non-axisymmetric temperature loading of zones of the diaphragm or by other unsymmetrically acting disturbance variables such as magnetic fields.

In an additional embodiment of the invention, an isolating diaphragm of a pressure transfer means filled with transfer liquid and having a working point in the reference position can, for example, be controlledly deformed or depressed in a zone around a point (r, ϕ) by means of a suitable body, whereby a corresponding opposed deformation is brought about in a zone around the point (r, -ϕ).

The named approaches for bringing about the antisymmetric deflection mode are, of course, combinable with one another in any way desired.

A pressure sensor of the invention comprises a hydraulic measuring system, which contains a pressure measuring cell with a pressure transducer for emitting a pressure-dependent electrical or optical signal, wherein the measuring system includes at least one hydraulic path and at least one pressure transfer means according to one of the preceding claims, and wherein the pressure measuring cell is loadable with at least one pressure via the at least one hydraulic path extending from the pressure chamber of the pressure transfer means to the pressure measuring cell.

The invention will now be explained on the basis of the examples of embodiments presented in the drawing, the figures of which show as follows:

FIG. 3b is the derivatives $\partial p/\partial w$ of the data p(w) from FIG. 3a.

DETAILED DISCUSSION IN CONJUNCTION WITH THE DRAWINGS

Figure 1A:
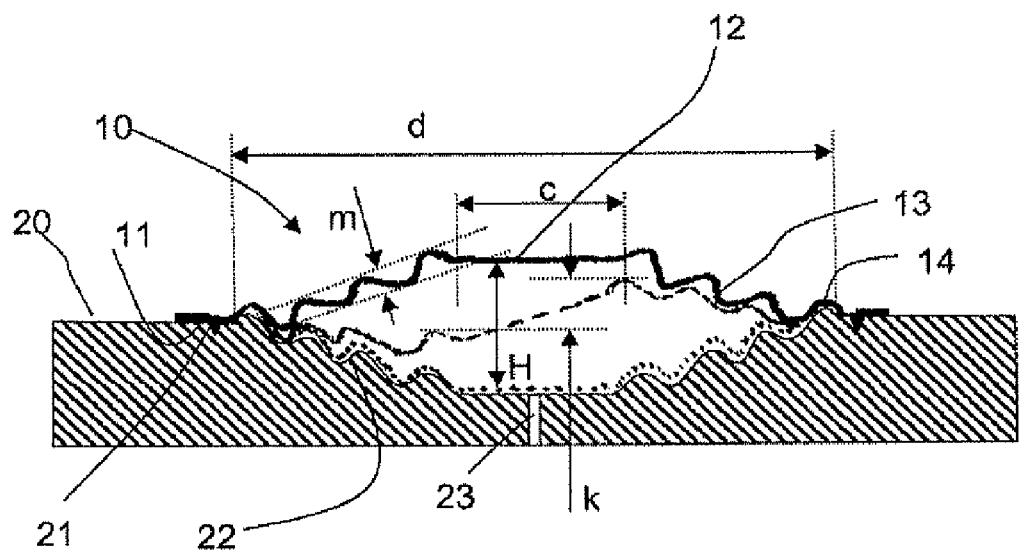
FIG. 1a is a longitudinal section through a pressure transfer means of the invention.

The cross section shown in FIG. 1a through a pressure transfer means of the invention shows an isolating diaphragm 10 with an edge region 11, which surrounds a deflectable working region. The working region includes a planar, central region 12, which is surrounded by a region with waves 13, whose amplitude initially decreases outwardly starting from the inside, until an outermost wave 14 follows, which again has a larger amplitude, and which, among other things, serves for decoupling from the deflections of the working region a weld seam 21, with which the isolating diaphragm 10 is secured to a body 20 of the pressure transfer means. The body 20 of the pressure transfer means includes a diaphragm bed 22, which essentially has the contour of the isolating diaphragm 10, wherein the contour of the isolating diaphragm can be produced, for example, by embossing of an earlier welded-on, planar, circular diaphragm blank against the diaphragm bed. Formed between the isolating diaphragm 10 and the diaphragm bed 22 is a pressure chamber, which, via an opening 23 which extends from the diaphragm bed through the body of the pressure transfer means, communicates with a hydraulic path in order to supply a pressure measuring cell with a pressure.

The isolating diaphragm is composed, for example, of a stainless steel having a modulus of elasticity of, for instance, 210 GPa. The material thickness amounts, in the case of this example of an embodiment, for instance, to h=100 μm. The diameter d (=2a) of the working region, which is bounded by the weld seam 21, amounts to, for instance, 58 mm.

The isolating diaphragm is deflectable by, for instance, $\Delta V=\pm 600$ μl about a reference position which is defined, for instance, by the plane of the weld seam 21.

This volume change $\Delta V$ corresponds to a dimensionless deflection of w=±6.8, or a stroke H of about 2·w·h=1.36 mm. The relationship between H and w is naturally only an estimation, in order to provide the order of magnitude, for w is ascertained from $\Delta V$ under the assumption of a cone-shaped volume stroke, which, in the case of the illustrated diaphragm form, obviously cannot be exactly true.

The planar central region 12 of the measuring diaphragm 10 has a diameter of, for instance, one half radius. Adjoining the central region are three waves of, for instance, equal wavelength. Their envelope bordering the central region has a peak-to-peak distance m of, for instance, 4 h, while this distance, at the second to the outermost wave, has fallen to 2 h.

The deflection of the isolating diaphragm for achieving the volume stroke $\Delta V$ is essentially an axisymmetric deflection, on which, however, in the case of the isolating diaphragm of the invention, a non-axisymmetric, especially antisymmetric, deflection is superimposed, wherein this non-axisymmetric deflection has its maximum, for instance, when the isolating diaphragm is located in the reference position. The maximum deflection of the non-axisymmetric deflection mode can, for example, have a value of k=, for instance, 2·h to 5·h.

With a deflection of the isolating diaphragm from the reference position, the deflection of the non-axisymmetric deflection mode decreases, wherein the deflection of the non-axisymmetric deflection mode, in the case of a deflection of the isolating diaphragm to $w(\Delta V_{desired})$, can disappear entirely.

Figure 1B:
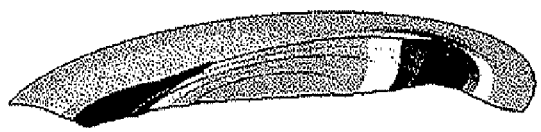
FIG. 1b is a representation of the simulation of the radial stresses in the isolating diaphragm of a pressure transfer means of the invention.
Figure 1C:
FIG. 1c is a representation of the simulation of the tangential stresses in the isolating diaphragm of a pressure transfer means of the invention.

FIGS. 1b and 1c show the results of FEM simulations for an isolating diaphragm of a pressure transfer means of the invention in or near the reference position, wherein the levels of gray represent radial stresses in FIG. 1b and tangential stresses in FIG. 1c. In the representations, it is clearly recognizable that the stress maxima occur near the extrema of the non-axisymmetric mode, whereas in a direction perpendicular thereto, in which the non-axisymmetric deflection essentially has a value of zero, the isolating diaphragm exhibits comparatively little or no stresses.

Figure 2:
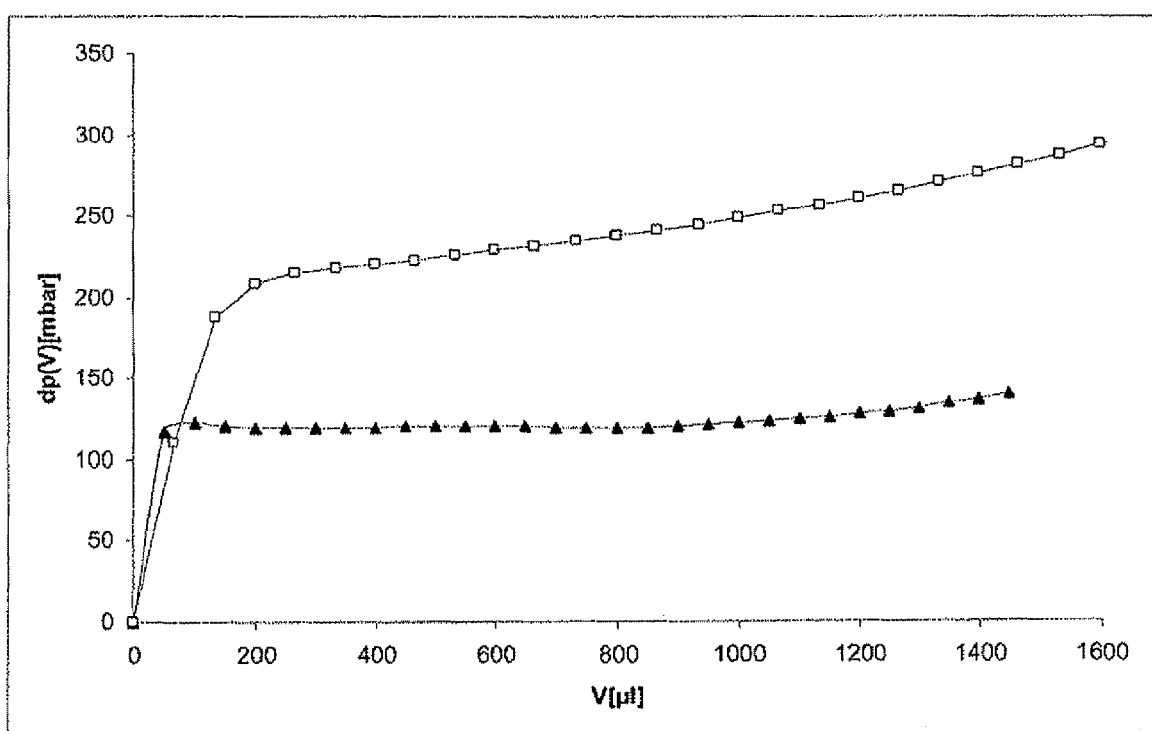
FIG. 2 is a drawdown curve dp(V) of a pressure transfer means of the invention (filled triangles) in comparison to a drawdown curve of a pressure transfer means according to the state of the art (open squares)

FIG. 2 shows a so called drawdown curve p(V) of a pressure transfer means of the invention (filled triangles) in comparison to a drawdown curve of a pressure transfer means according to the state of the art. A drawdown curve represents pressure in the pressure chamber as a function of the oil volume in the pressure chamber. The absolute position of the pressure values of the two curves is of lesser consideration. Essential is rather the question of how the pressure changes as a function of volume.

The steep fall toward zero volume results from the fact that the isolating diaphragm, in the case of this value, lies completely against a diaphragm bed, and, with the increasing bearing surface area, the mechanical properties are then no longer determined by the isolating diaphragm alone.

Figure 3A:
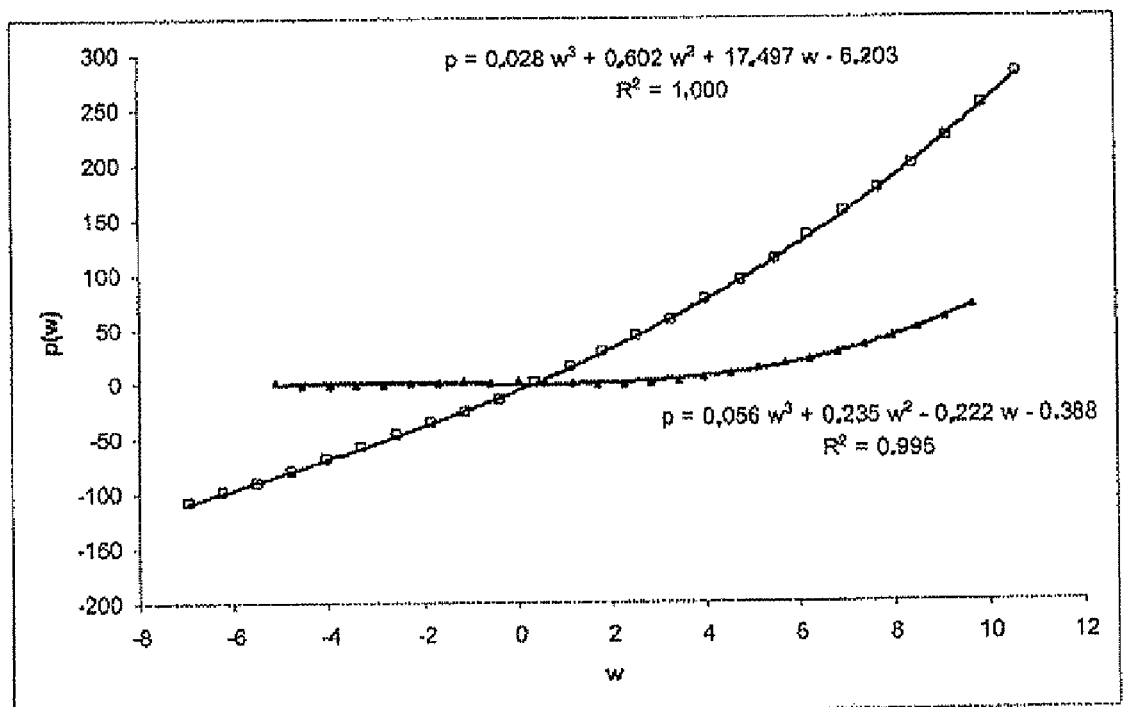
FIG. 3a is a graph of the dimensionless pressure p as a function of the dimensionless deflection w of a pressure transfer means of the invention (filled triangles) in comparison to corresponding data for a pressure transfer means according to the state of the art (open squares), which, in each case, follow from the drawdown curves in FIG. 2.

The dimensionless curves in FIG. 3a are derived from the data in FIG. 2 on the basis of Equations (1) and (2), wherein a coordinate displacement occurred with:

$w:=w(V-V_{ref})$, and $p:=p(dp(V)-dp(V_{ref}))$.

In such case, used for the diaphragm material was a modulus of elasticity of 210 GPa, a diaphragm thickness of 100 μm and a diameter of 59 mm for the working region of the isolating diaphragm according to the state of the art, and of 58 mm for the working region of the isolating diaphragm of the pressure transfer means of the invention.

Figure 3B:
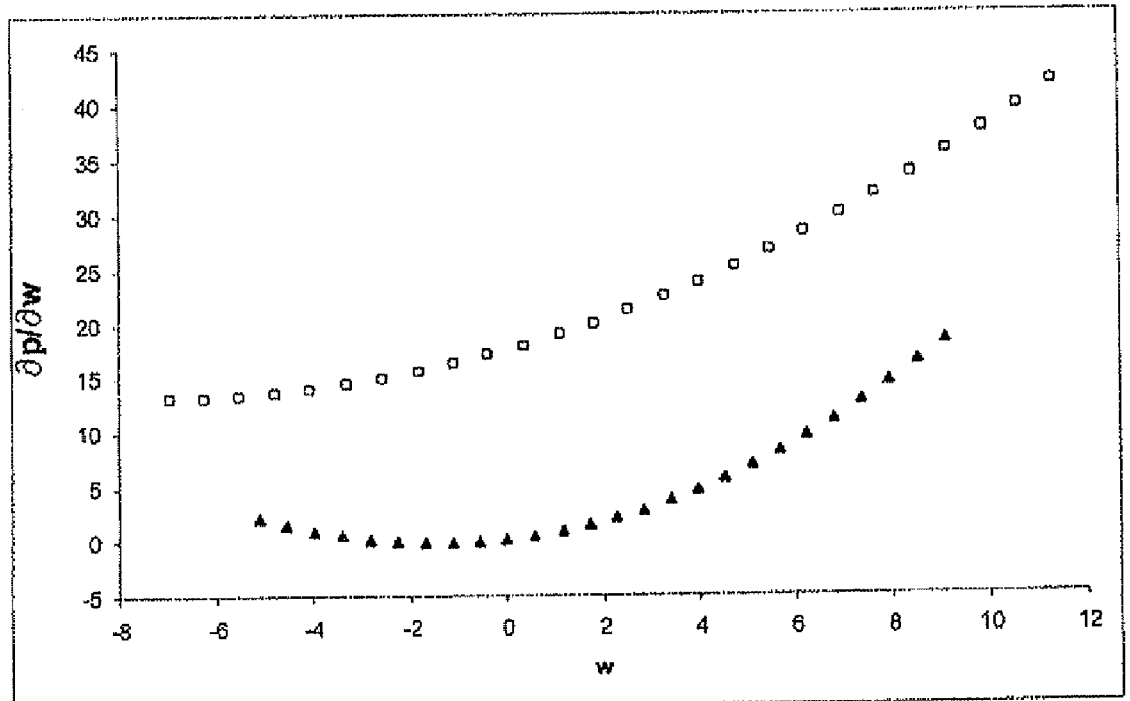

On the basis of the measurement data, in each case, a fit was generated with a polynomial of third order with the values illustrated in FIG. 3a. FIG. 3b shows the derivatives ∂p/∂w of the fitted functions of FIG. 3a.

FIGS. 3a and 3b give an impression of the kind of improvement achievable with a diaphragm of the invention in comparison to a diaphragm according to the state of the art.

Figure 3C:
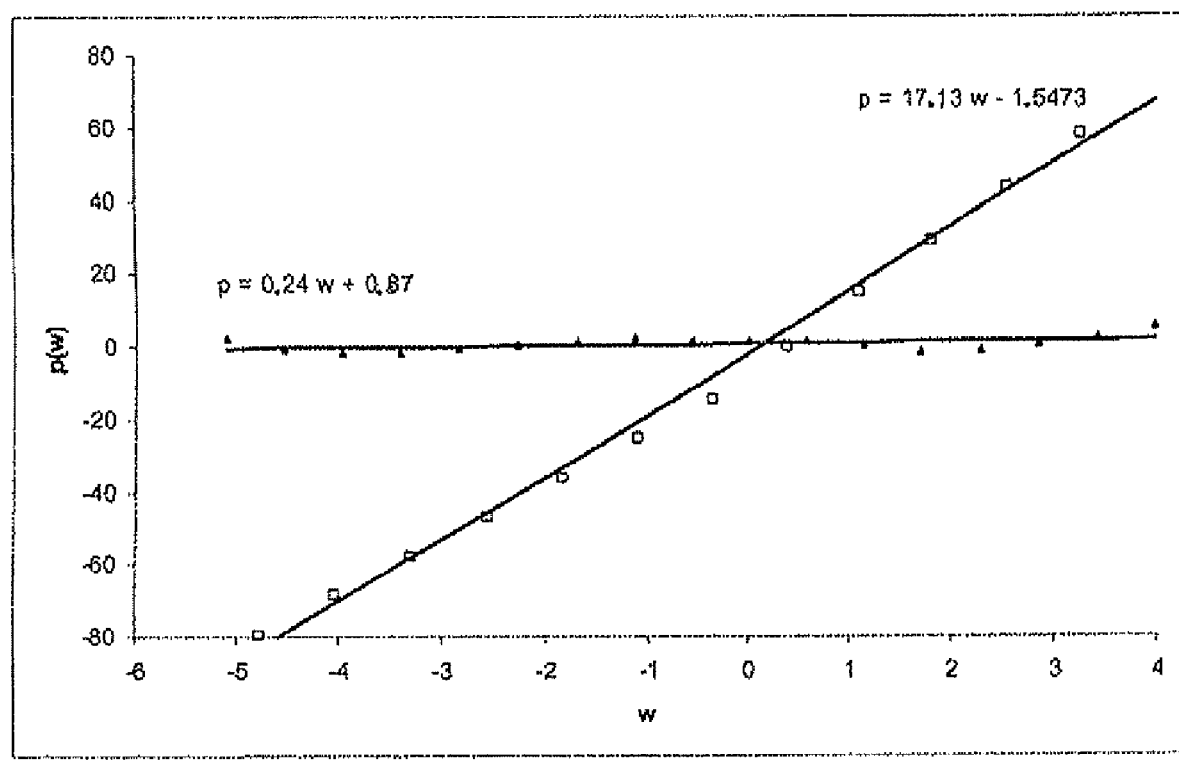
FIG. 3c is an example of the selection of a working point or a reference position for the pressure transfer means with the drawdown curves of FIG. 2.

Since, by selection of the amount of transfer liquid in the pressure chamber, the working point and the reference position of a pressure transfer means can be moved within certain limits, the pressure transfer means can be further optimized. FIG. 3c shows an example of this, in which p(w) is plotted over a range of −5<w<4 in comparison to corresponding data for the pressure transfer means according to the state of the art. For the selected range, a linear fit was superimposed for each case.

Here, the pressure transfer means of the invention shows, fitted over the total range, a slope of ∂p/∂w=0.24 in comparison to ∂p/∂w=17 for the state of the art. Of course, there can be instances where a linear fit is probably not sufficient for ridding a measurement of error; however it does permit a good estimation of the maximum error to be reckoned with and a comparison with the corresponding variable for pressure transfer means of the state of the art.

A value range of $w(\Delta V_{desired}) - w(-\Delta V_{desired}) = 4 - (-5) = 9$ corresponds, in the case of a diaphragm with a working region radius of 28 mm and a material thickness of 100 μm, to a working volume of $2 \Delta V_{desired} = 792$ μl. If one proceeds from the ascertained slope of ∂p/∂w=0.24, a change of the-volume dependent pressure of less than 1 mbar over the described region follows. This is significant progress compared to the state of the art.

The invention claimed is:

1. A pressure transfer device, comprising:
a pressure transfer device body having a surface; and
an isolating diaphragm, which is pressure-tightly connected with said device body along a circumferential sealing surface, wherein:
between the surface of said device body and said isolating diaphragm, a pressure chamber is formed, whose volume is dependent on the position of said isolating diaphragm;
said isolating diaphragm has a material thickness h and a deflectable working region of area A bordered by said circumferential sealing surface;
said isolating diaphragm has an embossed contour;
said isolating diaphragm has a reference position, in which said pressure chamber contains a reference volume $V_{ref}$;
said isolating diaphragm is deflectable from the reference position at least so far in two directions, that the volume of the pressure chamber can be varied between values of up to $V_{ref} +/- V_{desired}$;
associated with a volume change $\Delta V$ is a dimensionless deflection measure w, which is defined as $w(\Delta V) := (3 \cdot \Delta V)/(A \cdot h)$;
$\Delta V_{desired}$ is dimensioned in such a way that $|w(\Delta V_{desired})| \geq 2.5$;
in case of all $w(\Delta V)$, for which $|w(\Delta V)| \leq |w'(\Delta V)|$, $|w'(\Delta V)| \geq 0.5 \cdot |w(\Delta V_{desired})|$, said isolating diaphragm has a non-axisymmetric deflection mode, which is superimposed on an axisymmetric deflection of $w(\Delta V)$; and
the deflection of the non-axisymmetric deflection mode, in case of $|w(\Delta V)| = 0.4 \cdot |w(\Delta V_{desired})|$, amounts to at least 0.3 times, preferably at least 0.4 times and more preferably at least 0.5 times the maximal deflection of the non-axisymmetric deflection mode.

2. The pressure transfer device as claimed in claim 1, wherein:
the non-axisymmetric deflection mode includes, to a first approximation, an antisymmetric deflection mode, which is defined by a function $zas(r, \phi, \Delta V)$, for which:

$$zas(r, \phi, \Delta V) \geq -zas(r, \phi+180°, \Delta V);$$

the value for $zas(r, \phi, \Delta V)$ is given as the difference of the actual z-coordinate of a point of the surface of said isolating diaphragm and the z-coordinate of the point in case of a symmetric deflection of the isolating diaphragm:

$$zas(r, \phi, \Delta V) := z(r, \phi, \Delta V) - zs(r, \phi, \Delta V),$$

the function $zs(r, \phi, \Delta V)$ is to be selected in such a manner, that the integral of the square of $zas(r, \phi, \Delta V)$ over the area of the working region exhibits a minimum.

3. The pressure transfer device as claimed in claim 2, wherein:
a deflection mode is considered to be antisymmetrical when, in the case of a given $\Delta V$ for maximum value of $|zas(r, \phi, \Delta V)|$, following criterion for deviation from strict antisymmetry is obeyed:

$$[|zas(r, \phi, \Delta V) + zas(r, \phi+180°, \Delta V)|]/[|zas(r, \phi, \Delta V) - zas(r, \phi+180°, \Delta V)|] \leq 0.2, \text{ especially } \leq 0.1, \text{ preferably } \leq 0.05.$$

4. The pressure transfer device as claimed in claim 2, wherein:
the antisymmetric deflection mode has a dimensionless maximum deflection k, which is defined as $k := \text{maximum}(|zas(r, \phi, \Delta V) - zas(r, \phi+180°, \Delta V)|)/h$, for which: $|k| \geq 2$, preferably $|k| \geq 3$.

5. The pressure transfer device as claimed in claim 4, wherein:
maximum deflection of the antisymmetric deflection mode occurs near the reference position of said isolating diaphragm, when the deflection of said isolating diaphragm w amounts to less than $+/- 0.2\, w_{desired}$ especially less than $0.1\, w_{desired}$ and preferably less than $0.05\, w_{desired}$.

6. The pressure transfer device as claimed in claim 4, wherein:
for the maximum deflection k of the antisymmetric deflection mode, furthermore: $|k| \leq 6$, preferably $|k| \leq 5$, more preferably $|k| \leq 4$.

7. The pressure transfer device as claimed in claim 1, wherein:
for dimensionless pressure p':

$$|p(w(\Delta V_{desired})) - p(w(-\Delta V_{desired}))|/|w(\Delta V_{desired}) - w(-\Delta V_{desired})| \leq (|w(\Delta V_{desired})| + 2) * 2,$$

preferably $\leq (|w(\Delta V_{desired})| + 2)$,
especially preferably $\leq (|w(\Delta V_{desired})| + 2)/2$.

8. The pressure transfer device as claimed in claim 1, wherein:
for the dimensionless pressure p, in the case of all w with $|w| \leq (|w(\Delta V_{desired})| - 0.2|$:
$|p(w+0.2) - p(w-0.2)|/0.4 \leq (|w|+2) * 2$,
preferably $\leq (|w|+2)$,
especially preferably $\leq (|w|+2)/2$.

9. The pressure transfer device as claimed in claim 1, wherein:
the contour of said isolating diaphragm has a central, planar region, which is surrounded by a waved region having, preferably, concentric waves.

10. The pressure transfer device as claimed in claim 1, wherein:
the amplitude of waves initially decreases from inside moving outward; and
an outermost wave then adjoins, which again has a larger amplitude.

11. The pressure transfer device as claimed in claim 10, wherein:
the amplitude of a wave adjoining the outermost wave has, for instance, ⅓ to ⅔ the amplitude of a wave adjoining the central region.

12. The pressure transfer device as claimed in claim 11, wherein:
apart from the outermost wave, the waves have a maximum amplitude of no more than 4 h, preferably no more than 3 h, and further preferably no more than 2 h.

13. The pressure transfer device as claimed in claim 9, wherein:
apart from the outermost wave, the waves have a wavelength, which, from one wave to the next wave, varies by no more than 20%, preferably no more than 10%.

14. A pressure sensor, comprising:
a hydraulic measuring system, which contains a pressure measuring cell having a pressure transducer for emitting a pressure-dependent electrical or optical signal, wherein:
said hydraulic measuring system includes at least one hydraulic path and at least one pressure transfer device according to claim 1, and
said pressure measuring cell is loadable with at least one pressure via the at least one hydraulic path which extends from the pressure chamber of the pressure transfer device to said pressure measuring cell.

* * * * *